Feb. 1, 1949.  A. J. SCHMIDT  2,460,659
TIME RECORDING APPARATUS
Filed March 8, 1946  6 Sheets-Sheet 1

INVENTOR.
ARTHUR J. SCHMIDT
BY Victor J. Evans & Co.
ATTORNEYS

Feb. 1, 1949.  A. J. SCHMIDT  2,460,659
TIME RECORDING APPARATUS
Filed March 8, 1946  6 Sheets-Sheet 2

INVENTOR.
ARTHUR J. SCHMIDT
BY Victor J. Evans & Co.
ATTORNEYS

Feb. 1, 1949. A. J. SCHMIDT 2,460,659
TIME RECORDING APPARATUS
Filed March 8, 1946 6 Sheets-Sheet 3

INVENTOR.
ARTHUR J. SCHMIDT
BY Victor J. Evans & Co.
ATTORNEYS

Feb. 1, 1949.   A. J. SCHMIDT   2,460,659
TIME RECORDING APPARATUS

Filed March 8, 1946   6 Sheets-Sheet 5

INVENTOR.
ARTHUR J. SCHMIDT
BY Victor J. Evans & Co.
ATTORNEYS

Feb. 1, 1949.  A. J. SCHMIDT  2,460,659
TIME RECORDING APPARATUS
Filed March 8, 1946  6 Sheets-Sheet 6
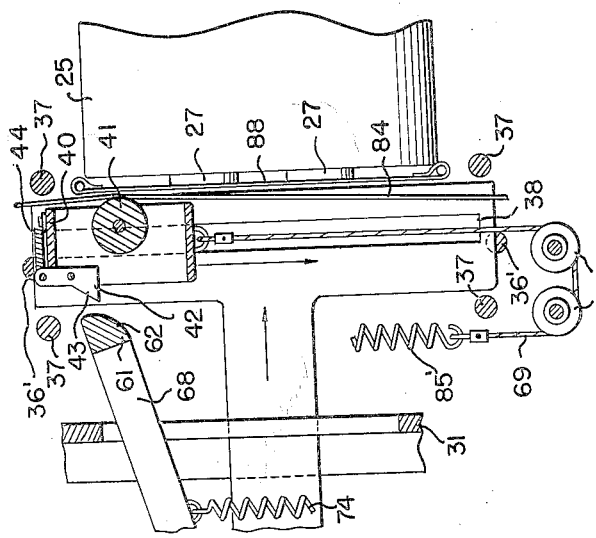
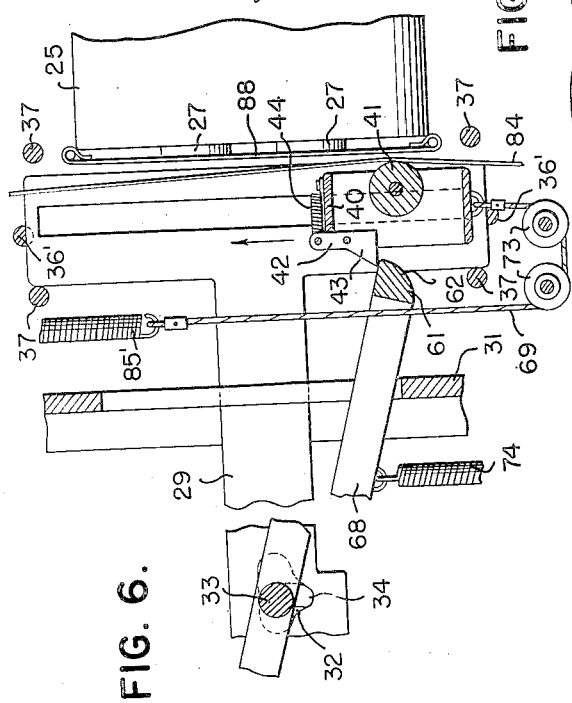
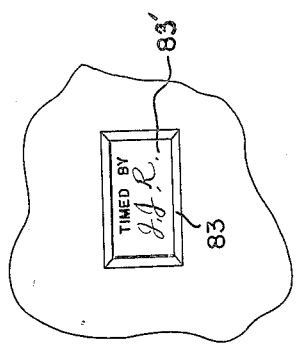
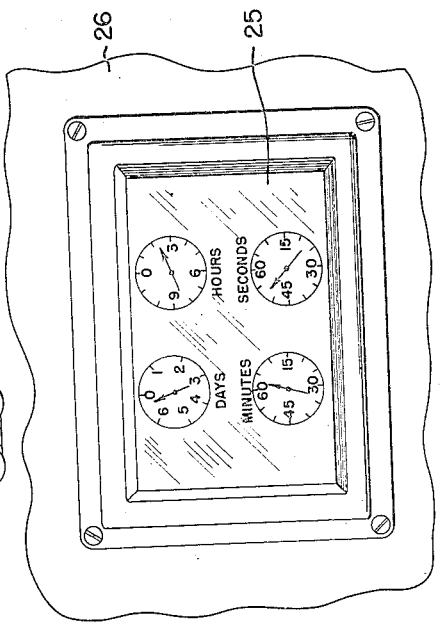
INVENTOR.
ARTHUR J. SCHMIDT
BY Victor J. Evans & Co.
ATTORNEYS Patented Feb. 1, 1949

2,460,659

UNITED STATES PATENT OFFICE 2,460,659

TIME RECORDING APPARATUS

Arthur J. Schmidt, Milwaukee, Wis.

Application March 8, 1946, Serial No. 653,209

4 Claims. (Cl. 101—288)

The present invention relates to new and useful improvements in time recording apparatus and has particular reference to apparatus for recording the time of arrival of pigeon flying competitions.

An object of the invention is the provision of time recording apparatus which is designed to prevent fraudulent tampering therewith.

Still another object of the invention is to provide a time recording apparatus of the aforesaid character which is compact in construction and which will clearly designate the time of arrival.

Other objects and advantages of the invention will become apparent as the description progresses.

In the accompanying drawings forming a part of this specification and in which like numerals are employed to designate corresponding parts throughout:

Figure 6 is a fragmentary horizontal section showing roller carriage at one end of its movement.

Figure 7 is a similar view showing the carriage at the opposite end of its movement.

Figure 8 is a fragmentary view showing the exterior of the clock mechanism and

Figure 9 is a fragmentary elevational view showing the marking aperture of the apparatus.

Figure 1:
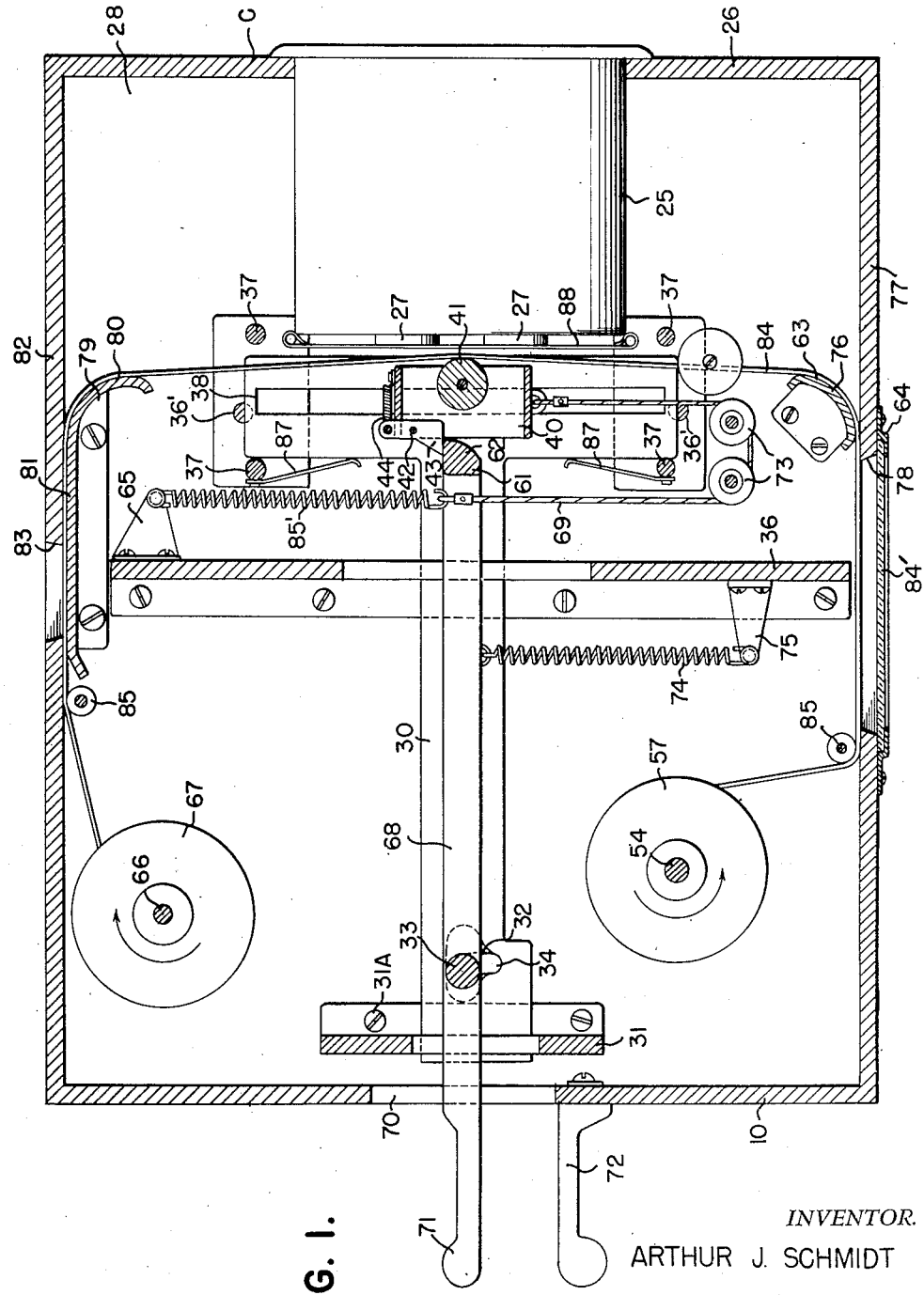
Figure 1 is a horizontal section through the apparatus on the line 1—1 of Figure 3 with gears and top plate removed.

Referring in detail to the drawings, wherein for the purpose of illustration is shown a preferred example of the invention, C generally designates an elongated rectangular-shaped casing open at the top and having connnected to an end wall 10 thereof a flat cover 11 connected with the casing by a hinge 12. Adjacent the free end the cover carries latch means including a disk-carrying pivot 13 journaled in a bushing 14 secured in registration with an aperture in the cover and having fixed thereto an agular fastening hook 15 detachably engageable with the slot in the vertical web 16 of a bracket piece 17. To the top of the pivot 13 is connected an arm 18 formed with an upstanding apertured ear adapted for sealing connection with an apertured lug 19, fixed on the cover, through the medium of a seal 20. At its intermediate portion the cover 11 is formed with a rectangular-shaped aperture 21 about which is fastened a Z-shaped guide frame 22 slidably engaging a cover plate 23 provided with a knob 24 for sliding the plate to aperture closing position or to an offset position opening the aperture.

In one end portion of the casing C is mounted a clock 25 of preferred known cnstruction having the outer end portion snugly fitted within an aperture in an end wall 26 and exposing thereat time indicating dials shown to advantage at Figure 8, preferably designating the time by a plurality of dials indicating the day, hour, minute and second. At the opposite end the clock mechanism 25 is adapted to provide a plurality of printing elements or dials 27 corresponding to the respective dials on the face of the clock.

In parallel horizontal planes in the casing C, between the cover 11 and the base 28 thereof, are mounted a pair of complementary T-shaped frame sections 29 and 30 disposed so that their head portions extend transversely adjacent the inner end of the clock 25 while their arm portions are directed longitudinally along the center line of the casing. The outer ends of the arm portions are slidably supported by an upstanding bracket 31 fixed on the base 28 by fasteners 31A provided with guide slots designed to receive the edges of the frame sections therein. Through an aperture 32 in each of these arm portions is extended a vertically arranged pivot shaft 33 formed with a pair of radially extending cam elements 34 arranged to coact with the aperture 32 in these sections. The head portions of these sections are slidably supported in transverse slots provided in supporting bracket rods 36' while their lateral movement is limited by pairs of rods 37 mounted adjacent the ends thereof. As shown in the drawings, each of these heads is formed with an elongated slot 38 in which is normally disposed a projection 39 formed on the upper and lower sides of a carriage frame 40. This vertically elongated frame carried a vertical presser roll 41 rotatably mounted therein so that a segmental portion protrudes from one side of the frame, as shown to advantage at Figure 1. The carriage frame 40 carries pivoted catch elements 42 the inner lower portions of which are tapered to provide a bevelled face 43. The outer reduced ends of these catches are connected to tension springs 44 attached to the frame 40 which functions to yieldingly hold the bevelled face 43 in predetermined projected position.

Figure 2:
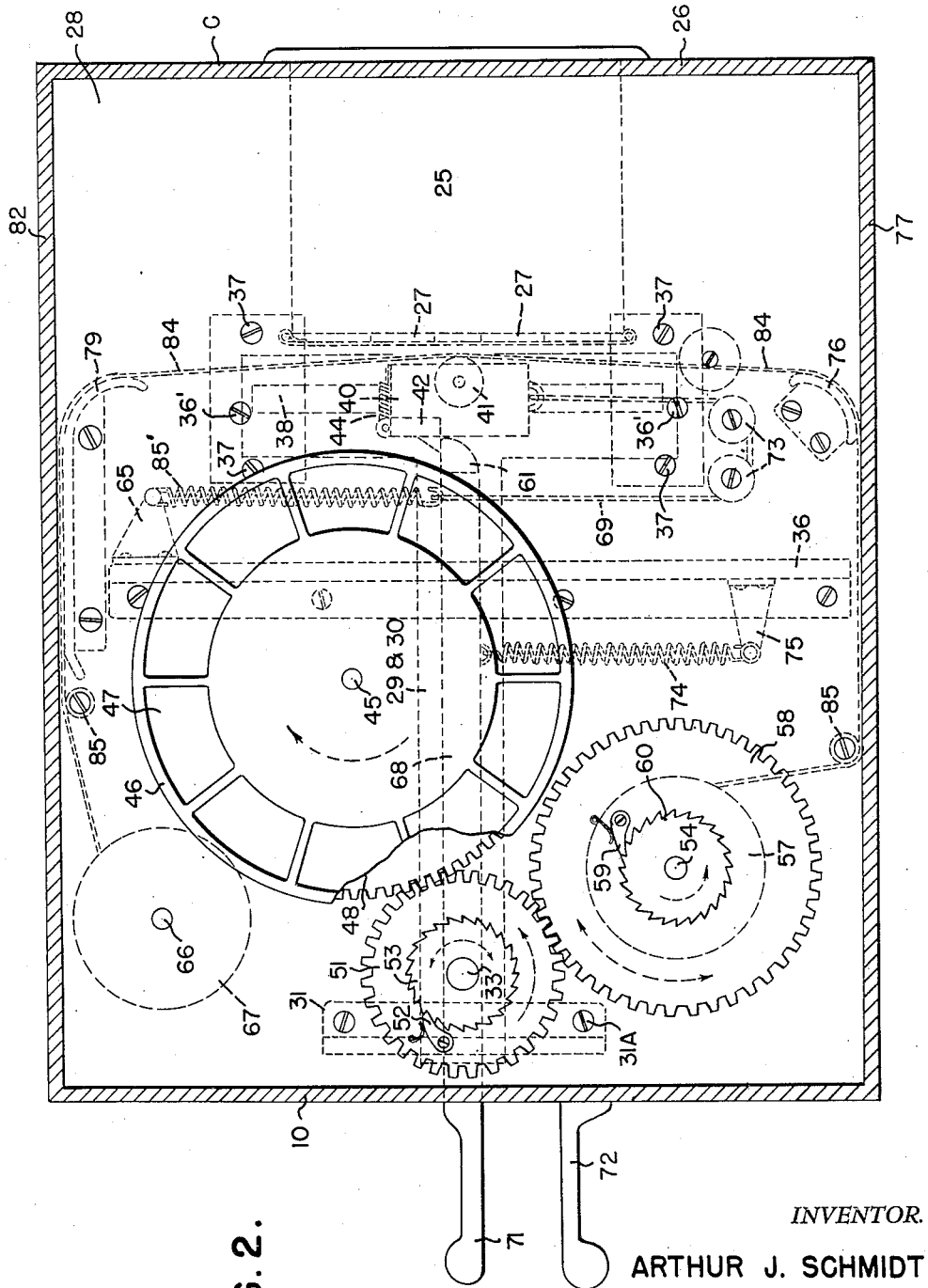
Figure 2 is the same on the line 2—2 of Figure 3 with the gears and plate in position.
Figure 3:
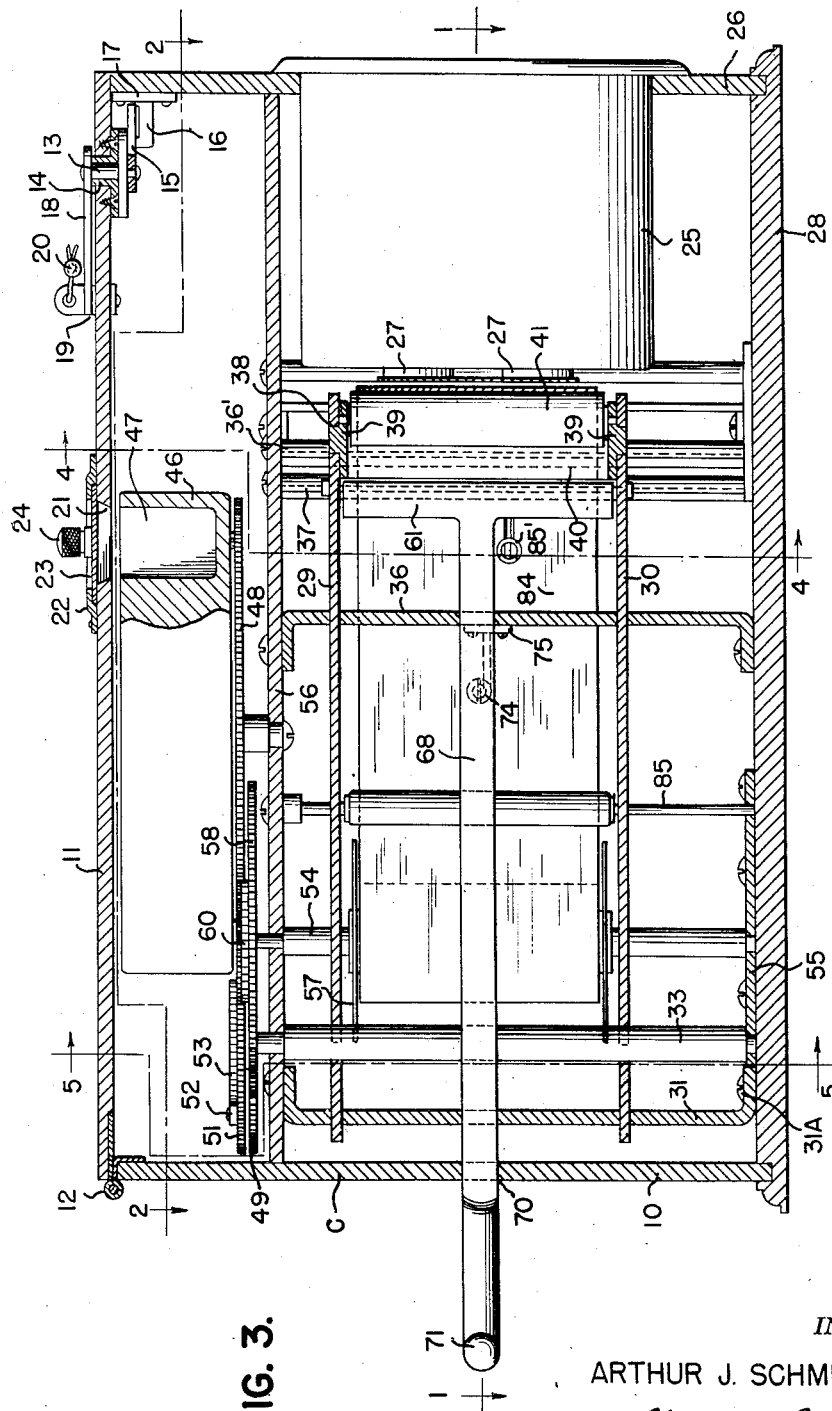
Figure 3 is a longitudinal vertical section of the apparatus
Figure 4:
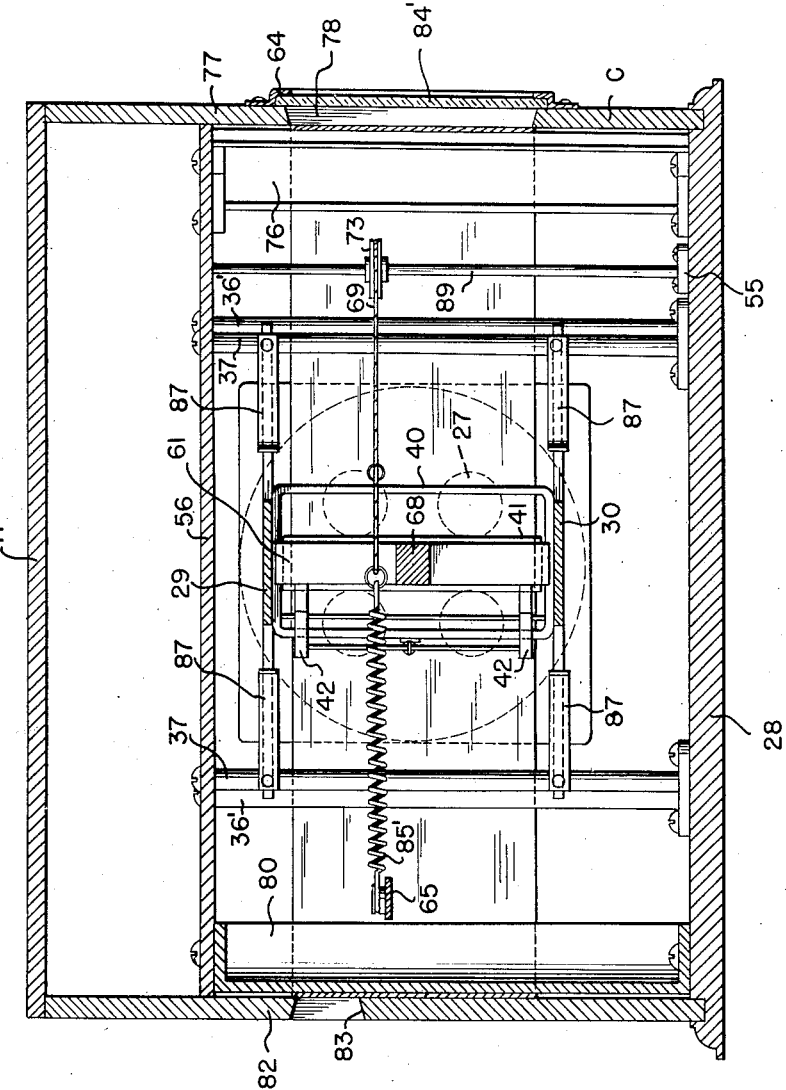
Figure 4 is a sectional view as viewed from line 4—4 of Figure 3.
Figure 5:
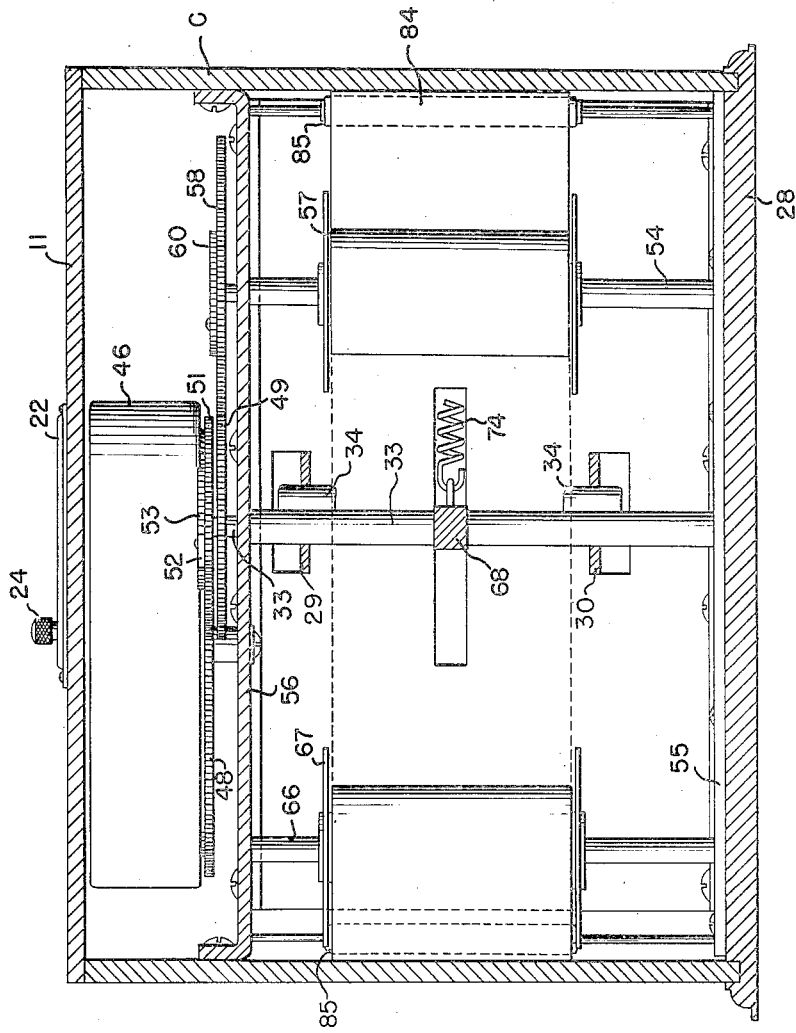
Figure 5 is a sectional view as viewed from the line 5—5 of Figure 3.

Supported horizontally in the upper part of the casing on a revoluble shaft 45 (Fig. 2) is a drum member 46 provided in its marginal portion with a plurality of segmental pockets 47 opening at the top and arranged for successive registration with the aperture 21 in the cover. At the bottom of this drum is fastened a spur gear 48 having a diameter approximately corresponding to that of the drum and meshing with a drive gear 51 fixed on the upper end of the vertical shaft 33. Mounted on shaft 33 below the loosely mounted gear 51 is a gear 49 which is fixed to the shaft 33. The gear 51 carries a pivoted pawl 52 on its upper face which latter is disposed to engage the peripheral teeth of a ratchet wheel 53 fixed on the shaft 33 immediately above the gear 51.

On a vertical shaft 54 journaled on bracket members 55 and plate 56 is secured a drum 57. On the shaft 54 above this is mounted a gear 58 which is loose on the shaft 54 and in coplanar relation with and meshing with the gear 49. The upper face of the sprocket 58 carries a pivoted pawl 59 engaging the peripheral teeth of a ratchet wheel 60 fixed on the shaft 54. In the bracket member 55 and plate 56 is journaled the vertical shaft 66 of a drum 67.

On the pivot shaft 33 is formed a horizontally extending lever bar 68 having a T shaped head 61. A portion of this shaft projects through a slot 70 in the end wall 10 of the casing and carries on its outwardly projecting end portion a handle grip 71. At the other end of the lever 68, the head 61 is disposed to make contact with the catch element 42 and the face of the head is curved at 62 to make a rolling contact surface. A tension spring 74 having one end attached to a bracket 75 secured to the brackets 36 opposite end connected with the inner portion of the lever, tends to yieldingly swing the lever to one extreme side position of its movement.

At one side of the apparatus is provided a guide bracket 76 fastened to the base 23 and arranged adjacent the side wall 77 near an observation aperture 78 in this wall. This bracket 76 is shaped to embody an arcuate guide surface 63 for a purpose which will be hereinafter described. At the opposite side of the casing is mounted a second guide bracket 79 providing a similar arcuate guide wall 80 and a flat wall portion 81 disposed closely adjacent the casing wall 82 in registration with a relatively small aperture 83 therein. The larger aperture 78 in the side wall 77 is normally covered by a transparent plate 84' of glass or the like mounted in bracket 64 secured to the outer surface of the wall 77. A coiled tension spring 85' having one end attached to the bracket 65 secured to the bracket 36 connects with a side of the carriage 40 by means of the cable 69 trained over roller pulleys 73 mounted on shafts 89, and tends to slide the same to one end of the heads of the frame sections 29 and 30.

In preparing the apparatus for use a tape 84, such as a strip of paper, is initially placed in the form of a roll on the drum 67 and trained therefrom in rectangular arrangement about an auxiliary guide roller 85, over the bracket 79, between the carriage roller 41 and the inner end of the clock, over the arcuate bracket 76, along the wall 77 over roller 85 and is attached to the takeup drum 57.

Upon the home arrival of a racing pigeon the usual identification element or ring is removed from the bird, fitted into a capsule and deposited through the inlet aperture 21 into one of the pockets 47 of the drum 46. The lever 68 is then actuated by gripping the handle 71 and the hand grip 72 secured to the wall 10 adjacent the handle 71 and swinging the same from its normal position, shown at Figure 6, to its opposite oblique position. This operation causes the head 61 of the lever 68 to engage the end of the catch 42 with the result that as the inner end of the lever is swung from the observation side of the casing, as shown at Figure 6, it slides the carriage therewith to the opposite end of the frame section heads in the slots 38 against the tension of the springs 74 and 85'. The resulting partial rotation of the pivot shaft 33 and the cams 34 thereon enable the pair of leaf springs 87 connected to a pair of rods 37 and bearing against the T sections, to slide these sections by the pressure exerted on the sections from their normal outward positions to inward positions against the inner end of the clock and to dispose the carriage 40 in such position that the roller 41 thereon will adpress the tape 84 against an inking element or ribbon 88 held against the printing dials 27.

As the lever approaches the end of its manual movement the head 61 thereof disengages the catch 42 releasing the carriage which is rapidly moved to its starting position through the instrumentality of the spring 85' while adpressing the strip against the printing mechanism to effect a rapid impression which will obviate blurring of the second hand printing. The manually initialed back and forth movement of the lever effects a to and fro movement of the gear 49 which through the medium of the ratchet mechanism, effects predetermined partial rotation of the take-up drum 57 and the pocketed drum 46 so as to advance this drum and the strip through one step of their intermittent movements. A person authorized to supervise the time recording may initial or make suitable notations on that part of the strip exposed through the aperture 83 while the time impression may be inspected subsequent to its printing as it moves past the observation aperture 78.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In an apparatus of the character described a casing, a time printing mechanism in said casing, a frame, roller means in the frame operable to rapidly press a strip against said printing mechanism, spring means urging said roller carrying frame out of printing contact with the printing mechanism, pivoted lever means for urging said roller carrying frame against the action of said spring means to load said roller pressing means in position to be released for rapid rolling contact against said printing mechanism, coacting means on said frame and lever for releasing the roller carrying frame at a predetermined point in its loading operation to the action of the spring means to cause a strip to be printed by said printing mechanism, and means under control of said pivoted lever for intermittently moving a strip with each loading operation.

2. The invention as in claim 1 wherein said casing is provided with a pair of horizontally disposed complementary shaped supporting sections, head portions on said sections, elongated slots in said head portions for movably mounting said roller carrying frame, and means connecting said sections to said lever whereby said sections are moved in unison with said frame.

3. The invention as in claim 1 wherein the co-acting means on said frame and said lever comprise pivoted spring tensioned catch elements on the frame and a head on the lever, said elements each being provided with a bevelled face and the head of said lever being provided with a curved marginal edge portion that is adapted to engage the bevelled faces of said elements to actuate said elements to release said frame to the action of the spring means.

4. The invention as in claim 1 wherein means is provided on said lever for moving said frame away from the printing mechanism during the intermittent movement of the strip.

ARTHUR J. SCHMIDT.

REFERENCES CITED

The following references are of record in the file of this patent:

UNITED STATES PATENTS

| Number | Name | Date |
|---|---|---|
| 839,458 | Cummings | Dec. 25, 1906 |
| 1,008,798 | Drummond | Nov. 14, 1911 |
| 1,593,287 | Card | July 20, 1926 |
| 1,714,143 | Schramm | May 21, 1929 |
| 1,961,821 | Fredrickson | June 5, 1934 |
| 2,087,338 | Wood | July 20, 1937 |
| 2,245,879 | Sossner | June 17, 1941 |
| 2,271,073 | Harris | Jan. 27, 1942 |